Dec. 13, 1932. R. H. MERGENTHEIM 1,890,691

MILK BOTTLE CAP

Filed Feb. 6, 1931

Witness:
Stephen V. Pelma

Inventor:
Rose H. Mergentheim,
By Frank L. Belknap
Atty.

Patented Dec. 13, 1932

1,890,691

UNITED STATES PATENT OFFICE

ROSE H. MERGENTHEIM, OF WINNETKA, ILLINOIS

MILK BOTTLE CAP

Application filed February 6, 1931. Serial No. 513,908.

This invention relates to improvements in milk bottle caps, and refers specifically to a milk bottle cap comprising a unitary imperforate structure provided with lines of incision defining a tab which may be subsequently removed from the plane of the cap proper by splitting the fibers of the cap between predetermined adjacent lines of incision providing an aperture in the cap through which milk may be poured from the bottle, the tab serving as a guiding means for the pouring milk stream.

The utility objects and advantages of my invention will be apparent from the accompanying drawing and following detailed description.

In the drawing, Fig. 1 is a top plan view of my milk bottle cap illustrating particularly the lines of incision defining the upper portion of the tab.

Figure 1:
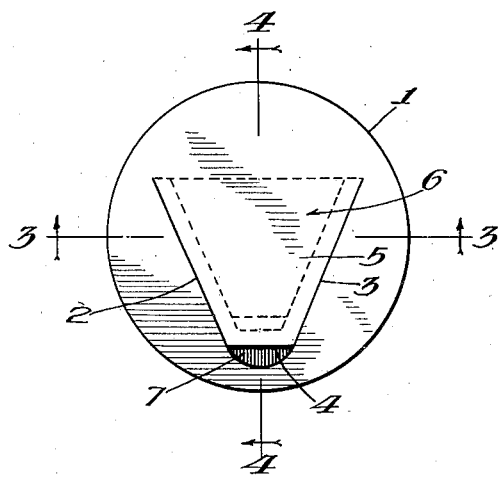
Figure 2:
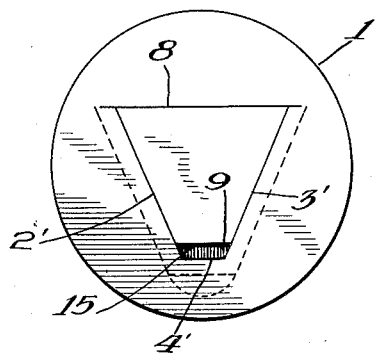
Fig. 2 is a bottom plan view of the cap shown in Fig. 1, illustrating the defining lines of incision for the lower portion of the tab.
Figure 3:
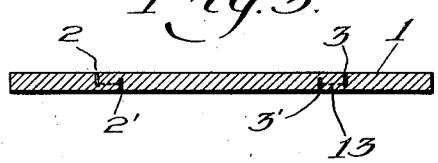
Fig. 3 is a sectional view taken on the line 3—3 of Fig. 1.

Referring in detail to the drawing, 1 indicates a milk bottle cap or closure which may comprise an annular disk constructed of a material similar to that used in the construction of the usual milk bottle cap. The thickness of the disk 1 may be substantially similar to that of the conventional milk bottle cap and the material comprising the disk may be treated with paraffin, wax or other treating agent. The uper face of the disk 1 may be provided with lines of incisions 2, 3 and 4, which may define the upper surface 5 of tab 6. A notch or indentation 7 may be provided adjacent the line of incision 4, the purpose of which will be hereinafter more fully described.

The lower face of the disk 1 may be provided with lines of incision 2', 3' and 4', which may be spaced in a horizontal direction inwardly from the lines 2, 3 and 4, respectively. In other words, the lines 2', 3' and 4' are offset with respect to the lines 2, 3, and 4, respectively. The ends of the lines 2' and 3' may be crossed by a line of incision 8, the extremities of which may terminate between the lines 2 and 2' and the lines 3 and 3', as shown. The lower face of the disk 1 may be provided with a notch or indentation 9 which may be extended between the ends of the incisions 2' and 3' and parallel to the line of incision 4'. The purpose of said notch will be hereinafter more fully described.

In utilizing my invention the disk or cap 1 may be mounted upon the mouth of a milk bottle 10, said mouth may be circumscribed by the annular lip 11 and may be provided with a depressed annular shoulder 12 adapted to support the outer edge of the cap 1. When it is desired to remove the milk from the bottle 10 the thumb nail may be inserted in the notch 7 upon the upper surface of the disk 1 and an upward thrust may be exerted upon that portion of the tab defined by the lines 2, 3 and 4. The result of this force will cause the splitting or rupturing of the fibers of the cap between the adjacent parallel lines of incision 2 and 2', 3 and 3' and 4 and 4', said splitting being adapted to take place along a surface 12 parallel to the upper and lower faces of the disk proper, the surface 13 being included at some point between the lower extremities of the upper incisions and the upper extremities of the lower incisions. In this manner shoulders 14 will be provided upon the tab 6 and also adjacent the defining edges of the aperture in the disk 1 formed by the raising of the tab. It can readily be seen that the bending of the tab 6 out of the plane of the disk 1 is facilitated by the line 8 which serves in a manner similar to a hinge. The milk may then be poured from the bottle over the surface of the tab 6 and said milk will thereby be prevented from contacting the annular lip 11 of the bottle.

In delivering, in bottling and also in other operations preparatory to the delivering of bottled milk the bottle is frequently handled. The natural place to grasp said bottle when handling is the annular lip which circumscribes the mouth. Therefore, it can readily be seen that inasmuch as the milk when poured from the bottle in the usual manner contacts said lip, that is, contacts that portion of the bottle which is most likely to harbor infectious germs. Consequently, by the provision of the tab 6 a deflecting means or a spout is provided as an integral part of the milk bottle cap, which prevents the milk from contacting the lip of the bottle and hence prevents the milk from being contaminated.

It has heretofore been proposed to provide offset lines of incision in the upper and lower surfaces of a milk bottle cap, said lines defining tabs of various shapes, some being circular and some being defined by U shaped incisions. Difficulties have been experienced in the use of these caps, in that when raising the tabs formed by the lines of incision the internal fibers of the cap would split along a plurality of planes and sometimes the entire tab would split along a plane parallel to the surface of the disk or cap 1, leaving half of the tab remaining as an integral portion of the disk and the remaining portion of the tab being bent outwardly from the disk. It can readily be seen that a tab of this character serves one purpose only, which would be merely that of a pull tab; that is, it would be a means of removing the entire cap from the mouth of the bottle.

To obviate the difficulties encountered by the prior art, I have provided a tab of substantially trapezoidal shape and cut the lines of incisions 2, 3 and 4 to a depth substantially two-thirds to three-fourths of the distance through the thickness of the cap 1. Likewise the lines of incisions 2', 3' and 4' may be cut upwardly a distance approximately two-thirds to three-fourths of the thickness of the cap. In this manner, regardless of what plane the tab may be split by the finger nail, so long as said plane may be included between the lower ends of the upper incisions and the upper ends of the lower incisions, the splitting action will result in the substantially clean cut shoulder 14. In addition, the notch or indentation 7 may be cut or impressed to a depth substantially equal to the depth of the upper incisions so that the finger nail can very conveniently select a plane which will be included between the lower ends of the upper incisions and the upper ends of the lower incisions.

Figure 4:
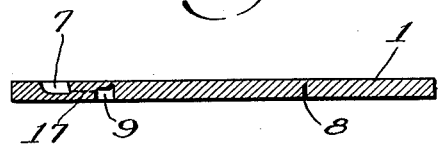
Fig. 4 is a sectional view taken on the line 4—4 of Fig. 1.
Figure 5:
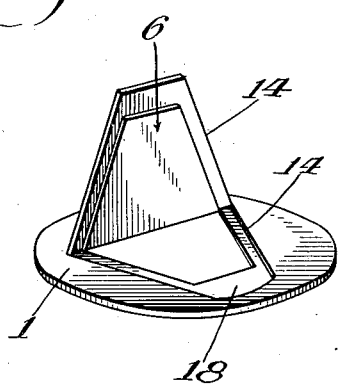
Fig. 5 is a perspective view illustrating particularly the tab in upraised position.
Figure 6:
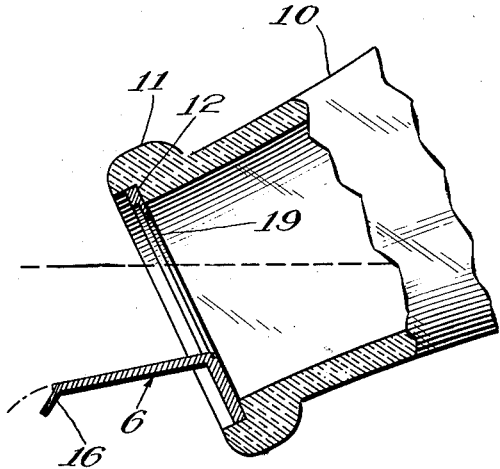
Fig. 6 is a fragmentary elevational view, partly in section, of a milk bottle cap in operative position upon the mouth of the milk bottle.

In addition, a secondary notch or indentation 9 may be provided, as has been hereinbefore described, in the lower face of the disk 1. The notch 9 may serve a plurality of purposes. First, it may assist in the rupturing or splitting of the fibers when the tab is pulled upwardly. It may accomplish this purpose by permitting the user to bend the smaller end of the trapezoidal tab upwardly and thereby secure a better grip upon said tab to complete the splitting operation. Secondly, that portion of the tab included between the line of incision 4 and the line of incision 15 may be bent backwardly as shown at 16 in Fig. 6, away from the surface of the tab 6 and also out of the path of the milk flowing over said tab. In this manner the only portion of the tab 6 which is touched by the human hand is prevented from contacting the milk being poured from the bottle. If difficulty is encountered in raising the tab, that is in starting the splitting action, the thumb nail may be inserted into the fibers of the tab adjacent the bottom portion of the notch or indentation 7 and may be forced inwardly toward the notch 9 along the dotted line 17, as shown best in Fig. 4, and inasmuch as the fibers are separated by the notch 9 a perfect splitting action will occur adjacent the surface 18.

It is to be understood, of course, that if desired the lower notch 9 may be entirely eliminated and a practical, efficient, separable tab will still result, the provision of the notch 9 being merely to facilitate the splitting action.

An important feature of my invention resides, in addition to the forementioned, in the shape and size of the tab 5 relative to the size of the disk 1. By providing the lines of incision 2, 2' and 3—3' in a diverging inclined direction with respect to the direction in which the tab is pulled, the splitting action will be facilitated. The size of the resulting aperture must be such as to permit the free pouring of the milk, which necessitates the provision of a vent space, as shown best at 19 in Fig. 6.

Of course, milk bottles are provided with mouths of various diameters, hence to specify precise dimensions would be useless, but approximate dimensions for purposes of example the following may be suggested; for a cap of approximately one and seven-eights inches in diameter the corners of the trapezoidal top may not be less than approximately one-quarter of an inch from the edge of the disk; for one and one-half inch caps, said corners may not be closer to the edges than approximately three-sixteenths of an inch.

It is to be understood, of course, that the above is given merely for purposes of example and is not intended to serve as a limitation upon my invention.

I claim as my invention:

1. A milk bottle cap which comprises in combination, a substantially circular disc of fibrous material provided with a plurality of lines of incision upon each face of the disc defining an integral tab, each of said lines of incision penetrating beyond the center of the thickness of the disc.

2. A milk bottle cap which comprises in combination, a substantially circular disc of fibrous material provided with a plurality of lines of incision upon each face of the disc defining an integral tab adapted to be bent upwardly from the upper surface of the disc, characterized in that the extremities of the incision lines from each face of the disc pass each other in the thickness of the disc.

3. A milk bottle cap which comprises in combination, a substantially circular disc of fibrous material provided with a plurality of lines of incision upon each face of the disc defining an integral tab adapted to be bent along one of the lines of incision upwardly from the face of the disc, characterized in that the extremities of the lines of incision from each face of the disc pass each other in the thickness of the disc.

4. A milk bottle cap which comprises in combination, a disc of fibrous material provided with a plurality of lines of incision upon each face of the disc defining an integral tab adapted to be bent upwardly from the face of the disc, characterized in that the extremities of said lines of incision from each face of the disc pass each other in the thickness of the disc.

5. A milk bottle cap which comprises in combination, a substantially circular disc of fibrous material provided with a plurality of parallel lines of incision upon each face of the disc defining an integral tab adapted to be bent upwardly from the upper surface of the disc, characterized in that the extremities of the incision lines from each face of the disc pass each other in the thickness of the disc.

6. A milk bottle cap which comprises in combination, a substantially circular disc of fibrous material provided with a plurality of parallel offset lines of incision upon each face of the disc defining an integral tab adapted to be bent upwardly from the upper surface of the disc, characterized in that the extremities of the incision lines from each face of the disc pass each other in the thickness of the disc.

7. A milk bottle cap which comprises in combination, a substantially circular disc of fibrous material provided with a plurality of lines of incision upon each face of the disc defining an integral tab adapted to be bent upwardly from the upper surface of the disc, characterized in that the extremities of the incision lines from each face of the disc pass each other in the thickness of the disc, the upper face of said disc being provided with a notch adjacent one of said lines of incision.

8. A milk bottle cap which comprises in combination, a substantially circular disc of fibrous material provided with a plurality of lines of incision upon each face of the disc defining an integral tab adapted to be bent upwardly from the upper surface of the disc, characterized in that the extremities of the incision lines from each face of the disc pass each other in the thickness of the disc, the upper face of said disc being provided with a notch adjacent one of said lines of incision and having a depth substantially equal to the depth of said line.

9. A milk bottle cap which comprises in combination, a substantially circular disc of fibrous material provided with a plurality of lines of incision upon each face of the disc defining an integral tab adapted to be bent upwardly from the upper surface of the disc, characterized in that the extremities of the incision lines from each face of the disc pass each other in the thickness of the disc, the lower face of said disc being provided with a notch adjacent one of said lines of incision.

In testimony whereof I affix my signature.

ROSE H. MERGENTHEIM.